United States Patent [19]

Chen et al.

[11] Patent Number: 4,798,104

[45] Date of Patent: Jan. 17, 1989

[54] OSCILLATORY TOOTH AND NEEDLE GEAR TRANSMITTING DEVICES

[76] Inventors: Shixian Chen, 68 Xiao Wei St.; Hung S. Wang, 37 Xue Yuan Rd.; Linai Chang, 227 Nan Xiao St., all of Beijing, China

[21] Appl. No.: 115,047

[22] Filed: Oct. 30, 1987

Related U.S. Application Data

[63] Continuation-in-part of Ser. No. 850,726, Apr. 11, 1986, abandoned.

[30] Foreign Application Priority Data

Apr. 12, 1985 [CN] China ................ 85200606

[51] Int. Cl.⁴ .............................................. F16H 1/28
[52] U.S. Cl. ..................................................... 74/804
[58] Field of Search .............................. 74/804, 805

[56] References Cited

U.S. PATENT DOCUMENTS

| 2,520,282 | 8/1950 | Henry | 74/804 |
|---|---|---|---|
| 2,919,589 | 1/1960 | Sundt | 74/804 X |
| 3,160,032 | 12/1964 | Black | 74/804 |
| 3,258,994 | 7/1966 | Gorfin | 74/804 X |
| 3,283,597 | 11/1966 | Doll | 74/63 |
| 3,448,638 | 6/1969 | Zahlaus | 74/804 |
| 3,468,175 | 9/1969 | Rabek | 74/63 |
| 4,050,331 | 9/1977 | Braren | 74/804 |
| 4,117,746 | 10/1978 | Pierrat | 74/804 X |
| 4,449,425 | 5/1984 | Carden | 74/804 X |

FOREIGN PATENT DOCUMENTS

| 1204466 | 6/1969 | Fed. Rep. of Germany. | |
|---|---|---|---|
| 2410472 | 9/1974 | Fed. Rep. of Germany | 74/804 |
| 113340 | 6/1984 | Japan | 74/804 |
| 214257 | 1/1967 | U.S.S.R. | |
| 1036979 | 8/1983 | U.S.S.R. | 74/804 |
| 1204466 | 9/1970 | United Kingdom | 74/805 |

OTHER PUBLICATIONS

"The Follower Tooth Reduction Gear", W. B. Molyneux, *Instn. Mech. Engrs.*, pp. 15–23, Published 3rd May, 1972.

*Primary Examiner*—Leslie A. Braun
*Assistant Examiner*—Dwight G. Diehl
*Attorney, Agent, or Firm*—Majestic, Parsons, Siebert & Hsue

[57] ABSTRACT

An oscillatory tooth and needle gear transmitting device which is chiefly composed of a wave-actuator, an oscillatory tooth wheel and a stationary needle gear.

The oscillatory tooth and needle gear transmitting device for transmitting rotary motion comprises a wave-actuator composed of an off-set standard rolling bearing, an oscillatory tooth wheel composed of a set of cylindrical pin-shaped oscillatory teeth with wedged trapezoid tooth heads, and a needle gear composed of a set of needle teeth with or without rolling sleeves, the three basic components being assembled coaxially. In the transmitting device, the reciprocal movement of oscillatory teeth is realized by meshing forces between tooth profiles, elastic return rings being unnecessary; multi-tooth meshing resulting in uniformized loads, the device of uniforming loads being removed.

The transmitting device has the features of large speed ratio, great loading capacity, high transmitting efficiency, compact structure and simplified machining process.

19 Claims, 5 Drawing Sheets

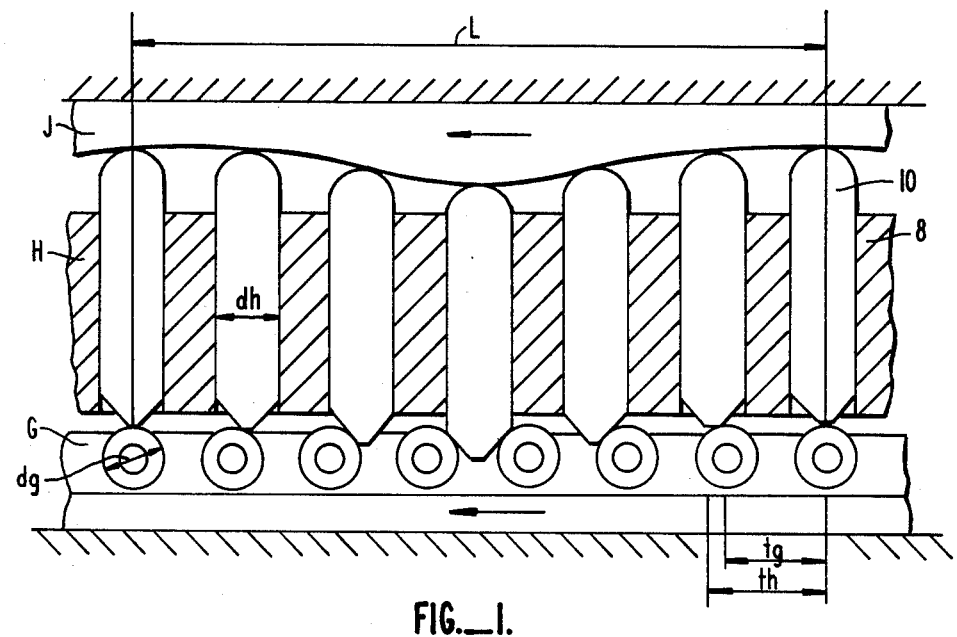
FIG._1.
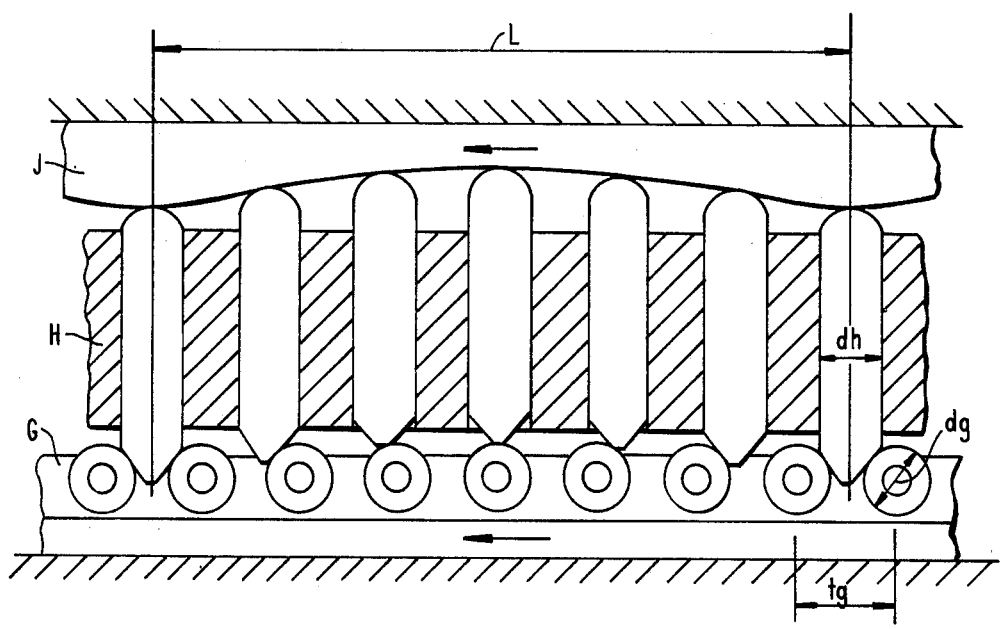
FIG._2.

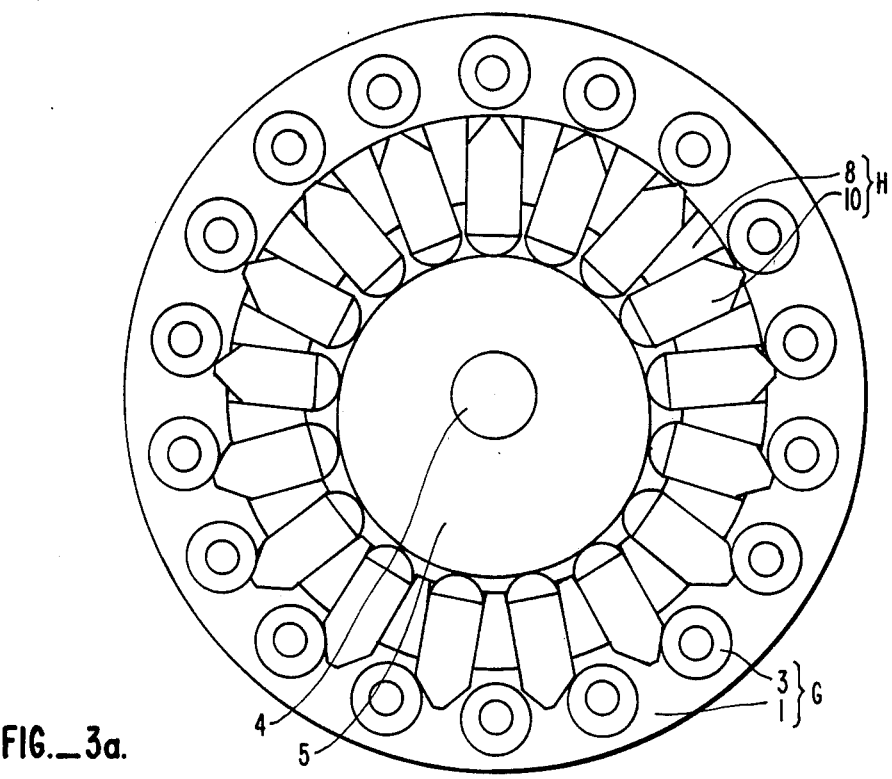
FIG._3a.
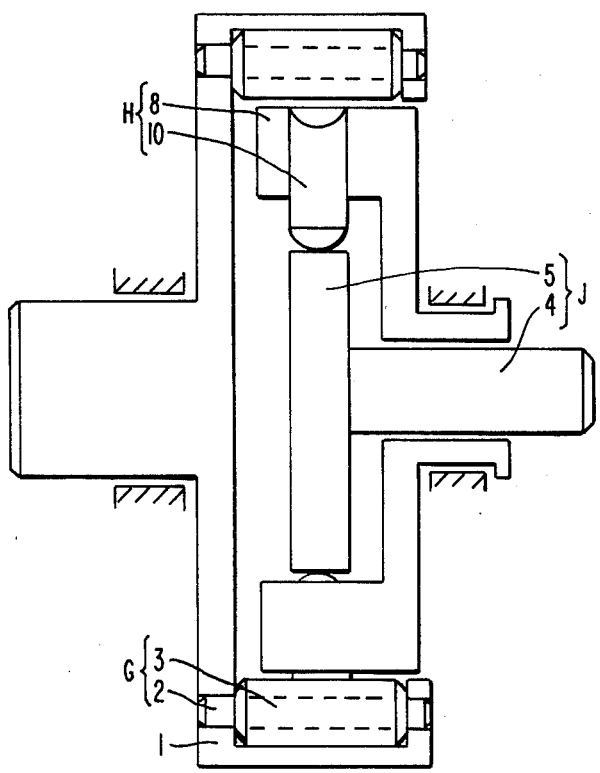
FIG._3b.

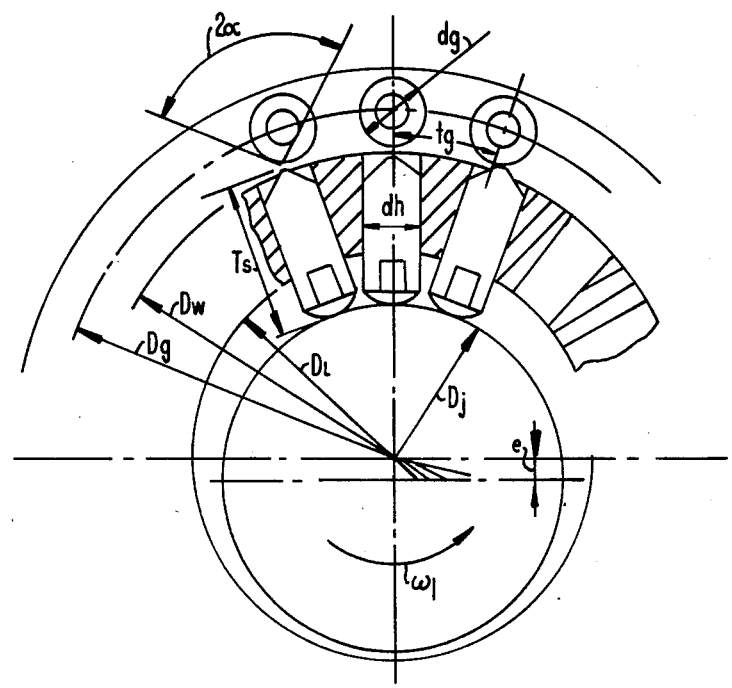
FIG._4.
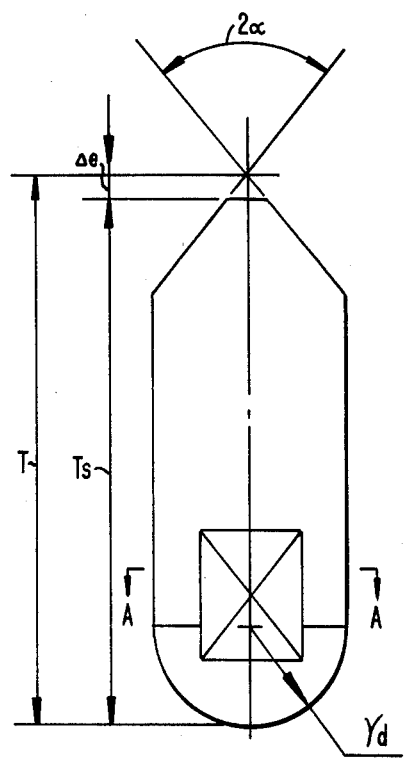
FIG._5.
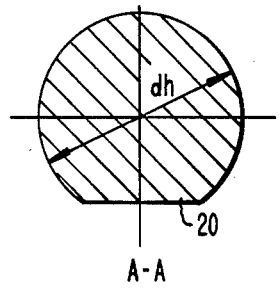
A-A

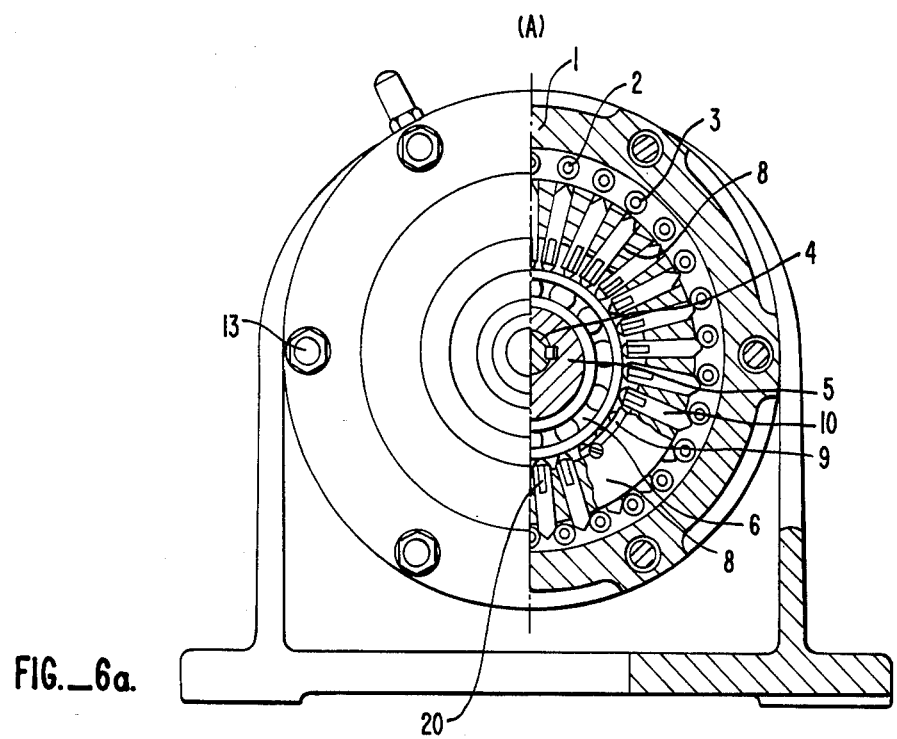
FIG._6a.
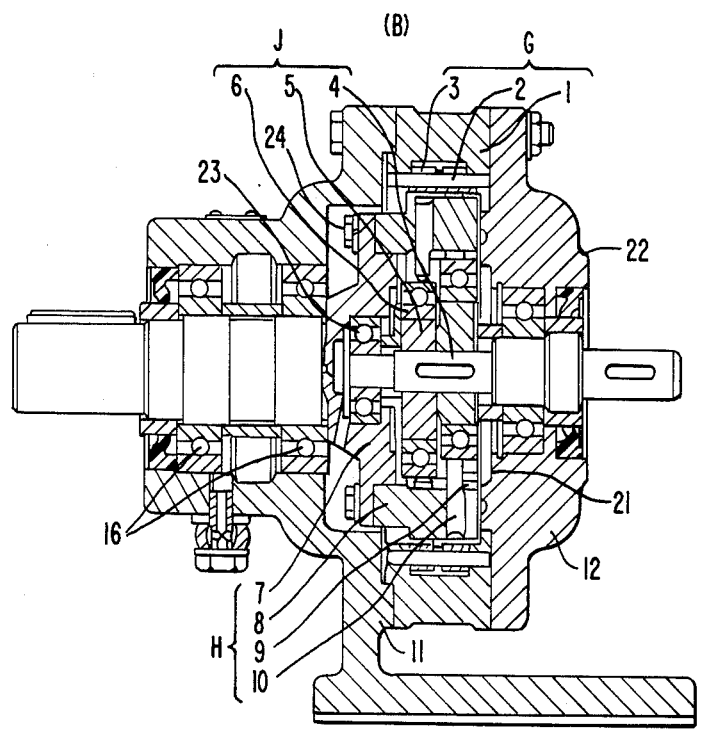
FIG._6b.

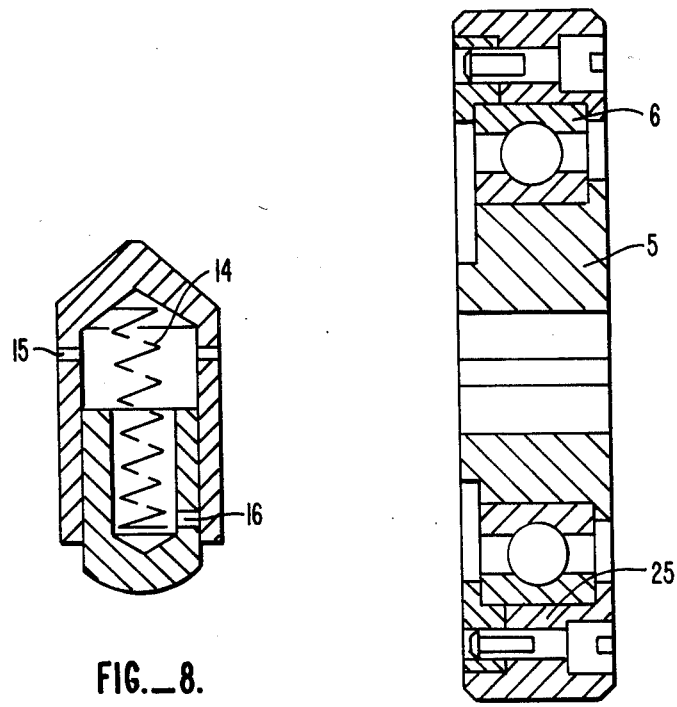
FIG._8.
FIG._7.
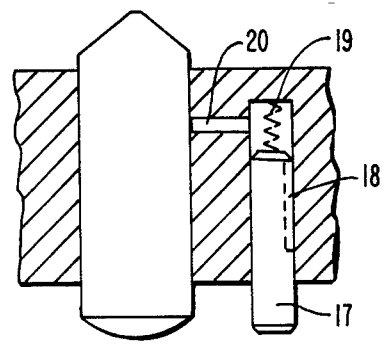
FIG._9.

4,798,104

OSCILLATORY TOOTH AND NEEDLE GEAR TRANSMITTING DEVICES

REFERENCE TO RELATED APPLICATION

This application is a continuation-in-part application of parent application "Oscillating-Tooth Speed Reducer", Ser. No. 06/850,726, filed Apr. 11, 1986, now abandoned.

BACKGROUND OF THE INVENTION

This invention relates to oscillatory tooth and needle gear transmitting devices of the kind in which a set of separately movable intermediate parts, the oscillatory teeth, are used to accomplish motion and power transmission, which are generally used for speed reduction transmission but can also be utilized for speed increasing or differential gear transmission.

A transmitting device using separately movable intermediate parts to accomplish mechanical transmission is essentially a kind of planetary gear transmission with small tooth number difference. It differs from ordinary planet gear transmission mainly in the fact that a set of separately movable intermediate parts are used to replace the planet gears which are in planetary movement (planar movement). Since two "higher pairs" are formed between the contacts of intermediate parts and the driver or follower parts, there exist four curves of "tooth profiles." Under the condition of constant speed conjugation between moving pairs, if any three of the curves are prescribed, the fourth can be determined using the method of envelope curve, four meshing designs being thus obtained. In early oscillatory tooth transmitting devices, such as DT1204466, SU214257 and the "sliding tooth speed reducer" manufactured by British Sanderson Brothers and Newbould Limited, the profile curve of driver part (an eccentric circle) and the curves of the two ends of movable intermediate parts (the oscillatory teeth) are prescribed, and the tooth profile curve of follower parts is determined by using the method of envelope curve. Generally this curve is special, very difficult to manufacture and undesirable in transmitting characteristics. The application and development of such designed transmitting devices are therefore limited. In U.S.S.R. Pat. No. SU1036979 is introduced a mechanical transmitting device in which the follower part is structured as a needle gear, i.e., a ring gear assembled by cylindrical pins. The driver part is still an eccentric circle and the oscillatory tooth has a plane bottom and a triangular head. Since it has no special tooth profile, this kind of transmitting device is much easier to manufacture, the primary obstacle for it to be popularized being eliminated. During each reciprocating cycle of the oscillatory teeth in the transmitting device introduced in U.S.S.R. Pat. No. SU1036979, the follower part is driven by the meshing force between the tooth profiles of oscillatory teeth and needle gear in the working stroke, but the oscillatory teeth are pulled back by elastic return ring (reference No. 5 in Fig. of SU1036979) during the backward stroke rather than by the meshing force between tooth profiles. Furthermore, it is obvious from the figure that the thickness of the plate-structured oscillatory teeth is evidently smaller than the space between two needle teeth. Should there not be an elastic return ring to pull back the oscillatory teeth, they would be inserted into the space between needle teeth, unable to return back and self-locked, making the transmitting device unable to work. In the prior arts aforementioned, most of them have complicated tooth profiles, and all of them have to use elastic return rings. It has been proven by both theory and practical application that there is a greater circumferential friction between oscillatory teeth and the elastic return ring, and the latter causes some interference among oscillatory teeth. This not only lowers the transmission efficiency, but also increases the noise level. In addition, the oscillatory teeth in U.S.S.R. Pat. No. SU1036979 have triangular heads which, driven by the eccentric circle, result in an approximate mesh with the needle gear. If geometric parameters are improperly chosen, they will cause unsteady angular speed and unequal load. An elastic ring (reference No. 5 in Fig. of SU1036979) is thus needed in said patent to function as a compensatory element. When meshing in the tip area, there will be a larger pressure angle unfavorable to tooth strength for the oscillatory tooth. Moreover, the oscillatory tooth in U.S.S.R. Pat. No. SU1036979 is plate-structured, its width (measured along the axis of speed reducer) being 2-3 times larger than its thickness. This kind of structure is unfavorable to the strength and rigidity of the oscillatory tooth wheel, more difficult in machining and inconvenient to have a symmetric twin-row arrangement for balancing the load and increasing the transmitting capacity. The unequal load along the width of the head of oscillatory tooth is yet another problem difficult to be solved.

SUMMARY OF THE INVENTION

The object of this invention is to design an oscillatory tooth and needle gear transmitting device in which neither complicated tooth profiles nor elastic return rings are needed, internal loads are uniformized and inertial forces are mostly balanced, thus leading to easy machining, low cost, automatic return of oscillatory teeth by means of meshing force, greater load capacity, higher efficiency and smaller inertial force.

To achieve the aim abovementioned, the solutions of this invention are as follows:

A rolling bearing mounted on an eccentric disk is used as a wave-actuator to drive a set of pin-shaped oscillatory teeth which are fitted in an oscillatory tooth wheel and radially slidable and make them mesh with an internal needle gear;

the tooth head of the oscillatory tooth is shaped like a wedged trapezoid and the needle gear is composed of a set of cylindrical pins (with or without sleeves), special curves for internal tooth profile being unnecessary;

the geometric parameters are properly chosen, resulting in an approximate constant speed conjugation movement with enough accuracy and a uniformized load distribution among needle teeth;

both working stroke and back stroke of oscillatory teeth are driven by meshing force between tooth pairs, elastic return ring being unnecessary;

in addition to single-row oscillatory tooth transmission, a 180°-symmetric twin-row oscillatory tooth transmission may be structured to balance most internal and inertial loads, the transmission characteristics being improved;

small sized oscillatory teeth are used to replace ordinary planet gears, transmission inertia being reduced.

The working principle of this invention will be briefly described as follows.

Referring to FIGS. 1 and 2, the oscillatory transmitting device comprises three basic components: waveactuator J (plate cam), oscillatory tooth gear H (oscillatory tooth holder) and ring gear G When operating, wave-actuator J (plate cam) periodically actuates oscillatory teeth 10 to make them move back and forth. The wedged trapezoid heads of these teeth form a wave like a creeping snake, thus accomplishing a continuous transmission relation with ring gear G (rack).

In these figures, L is the wave length within which the number of oscillatory teeth is $Z_h$ and the number of stationary teeth is $Z_g$, where $Z_g = Z_h \pm 1$, in which sign "+" applies to transmission in the same direction while sign "−" applies to transmission in the opposite direction.

Assuming that oscillatory tooth holder 8 is stationary, if plate cam J moves leftward as shown in FIG. 1, it will then press down successively the oscillatory teeth 10 on the left half side which will push rack G also leftward. At the same time, the moving plate cam J will release the oscillatory teeth 10 on the right half side which, pushed up respectively by the circular teeth of rack G, will contact with plate cam J.

After plate cam J moves leftward a distance of L/2, the whole transmitting device will appear as shown in FIG. 2. If plate cam J continues moving leftward, it will then press down the oscillatory teeth 10 on the right half side which will push rack G continuously leftward, meanwhile the oscillatory teeth 10 on the left half side will return back to their original position. When plate cam J continuously moves leftward, after moving every half of wave length L/2, the plate cam J will alternately press down the oscillatory teeth 10 on the left or right side, pushing rack G continuously leftward, and vice versa. Since the meshing of tooth pairs is conducted alternately, overlapping and continuously, no dead point exists.

When plate cam J moves a distance of wave length L, rack G will move a distance of tooth pitch $t_g$, the speed ratio therefore is:

$$i = L/t_g = (Z_g \cdot t_g)/t_g = Z_g$$

If any one of the three basic components (J,H,G) in the abovementioned oscillatory tooth transmission is fixed, the other two can be mutually a driver and a follower components; if two of them are used as driver components, a differential speed transmission is then obtained from the third component.

Making one or several wave lengths (usually one) of the abovementioned transmitting device a circle, the oscillatory teeth are distributed radially, an oscillatory tooth transmission of rotating motion is then formed as shown in FIG. 3a.

In this case, the plate cam becomes waveactuator J composed of input shaft 4 and disk cam 5; the oscillatory tooth holder becomes oscillatory tooth wheel H composed of oscillatory teeth 10 and circular oscillatory tooth disk 8; and the circular tooth rack becomes internal ring gear G (or needle gear) composed of cylindrical needle teeth 3 (with or without rolling sleeves) and needle tooth disk 1.

When any one of the abovementioned basic components is relatively fixed, different speed ratio corresponding to different component fixed can be obtained as follows:

Oscillatory tooth wheel H fixed, $i_{JG} = Z_g/(Z_g - Z_h)$;

Internal ring gear G fixed, $i_{JH} = -Z_h/(Z_g - Z_h)$;

Wave-actuator J fixed, $i_{HG} = Z_g/Z_h$

In order to ensure that the abovementioned transmitting device is able to operate continuously and efficiently with constant speed ratio, the following measures are adopted:

(1). The four curves of two higher pairs at disk cam 5 and the bottom surface of oscillatory teeth 10 as well as the tooth profiles of oscillatory teeth and needle teeth must be designed in terms of conjugation principle with constant speed ratio. Generally three of the curves are prescribed, the fourth is determined by using envelope method. In this invention, an eccentric circle is used as the profile of waveactuator namely disk cam, the bottom surface of the oscillatory tooth is spherical or with a miniature flat surface, and the internal teeth of the ring gear are made up of cylindrical needles with or without rolling sleeves. So long as the transmission parameters and geometric dimensions are chosen from certain range, the curve of oscillatory tooth profile obtained by using envelope method can be fitted by a straight line with enough accuracy.

(2). To ensure that the movement of oscillatory teeth both in working stroke and in back stroke is carried out by meshing forces between tooth profiles, the following necessary relationship among the width of oscillatory teeth in the plane of meshing movement (or diameter for cylindrical oscillatory teeth) $d_h$, the pitch of needle teeth $t_g$ and the diameter of needle teeth $d_g$ must hold:

$$d_h > t_g - d_g.$$

(3). To ensure that the movement of oscillatory teeth both in working stroke and in back stroke is carried out by meshing forces between tooth profiles with high transmission efficiency, smooth motion and uniform load, the tooth head of oscillatory teeth is preferably shaped with a wedge angle $\alpha$ and a height of $\Delta e$ of the tooth tip is preferably cut off to form a trapezoid tooth head so as to avoid meshing in the area of unfavorable pressure angle.

The wedge angle of tooth head $\alpha$ and the amount of cutting off the tooth tip $\Delta e$ can be chosen from the range:

$$\text{alpha} = 30° \sim 45°;$$

$$\Delta e = (0.1 \sim 0.15)e,$$

where e is the eccentricity of wave-actuator, its value depending on the pitch of needle teeth. Preliminarily e may be chosen from:

$$e = (0.15 \sim 0.2)t_g.$$

The diameter of eccentric circle for waveactuator $D_j$ preferably is in accordance with the relationship:

$$D_j < D_L - 2e,$$

where $D_L$ is the internal diameter of oscillatory tooth disk 8, its value depending on the external diameter of oscillatory tooth disk $D_W$ and the length of oscillatory tooth slots L:

$$D_L = D_W - 2L;$$

$$L = (1.5\sim2)d_h.$$

(4). The preliminarily calculated diameter of eccentric circle for wave-actuator $D_j$ must be rounded off to the nearest value of diameter of standard rolling bearings so as to directly employ a standard rolling bearing as wave-actuator. As for a large sized waveactuator, an additional circular disk may be mounted onto the off-set bearing as a wave-actuator.

After the parameters of wave-actuator diameter $D_j$, eccentricity e, pitch $t_g$ and speed ratio i, etc. are preliminarily determined, the profile curve of oscillatory teeth may be found and fitted by a straight line, finally the calculating length T and wedge angle of oscillatory teeth or may be determined. To prevent a cylindrical oscillatory tooth with wedged trapezoid head from rotating about its axis, a positioning plane 20 is made on the oscillatory tooth body. The structure and dimensions of this kind of oscillatory teeth are shown in FIG. 5.

This invention has overcome the shortcomings inherent in aforementioned prior arts and has the following significant advantages:

1. The correct meshing between tooth profiles of oscillatory teeth 10 and needle teeth 3 is maintained in both working and back strokes so as to ensure that self-locking will never happen, the elastic return ring is therefore unnecessary. This correct meshing in both strokes is achieved by meshing calculation between tooth profiles based on properly arranging the geometric relations among needle tooth pitch $t_g$, needle tooth diameter $d_g$ and oscillatory tooth diameter $d_h$, as described above.

2. The tooth head of oscillatory teeth 10 is changed into the form of wedged trapezoid, the tooth body may be a cylinder with any cross-sectional shape such as rectangle, circle, etc. preferably a cylinder of circular section with a little convexity, a positioning plane 20 is made on the tooth body, and tooth tail is spherical or with proper miniature flat surface. A linear contact between the tooth head and needle tooth 3 is therefore obtained. The strength and rigidity of oscillatory tooth disk 8 are enhanced, which is favorable to uniformizing the load distribution along the meshing line on tooth head and making symmetric twin-row arrangement. The machinability of oscillatory teeth 10 and oscillatory tooth disk 8 is obviously improved.

3. A small height of oscillatory tooth tip is cut off to form a trapezoid tooth head, thus averting meshing in the area of unfavorable pressure angle and improving the load capacity and strength of oscillatory teeth 10. The preferred dimensions of the tooth head are elaborated above. When using a straight line to fit the theoretical profile of oscillatory tooth head and determining the transmission parameters, the error between linear profile and theoretical profile is kept to a value smaller than the profile error of involute teeth, resulting in smooth transmission and uniformized load distribution. The elastic ring 5 for uniformizing the load introduced in U.S.S.R. Pat. No. SU1036979 in this case becomes unnecessary, the structure and machining process of the transmitting device being simplified and performance improved.

BRIEF DESCRIPTION OF THE DRAWINGS

FIG. 1 is a sketch showing an oscillatory tooth transmitting device with linear motion;

FIG. 2 is a sketch of FIG. 1 after the plate cam moves a distance of L/2;

FIG. 3a and 3b are sketches showing an oscillatory tooth transmitting device with rotating motion, where (a) is the front view and (b) the side view;

FIG. 4 is a sketch showing the relation of geometric dimensions for oscillatory tooth transmitting device with rotating motion;

FIG. 5 illustrates the structure and dimensions of a cylindrical oscillatory tooth with wedged trapezoid tooth head;

FIGS. 6a and 6b are detailed drawings showing the structure of preferred embodiment for an oscillatory tooth and needle gear speed reducer;

FIG. 7 shows a large sized wave-actuator, which is structured by an additional disk mounted onto an offset standard rolling bearing;

FIG. 8 shows the structure of an oscillatory tooth with plunger pump;

FIG. 9 shows the structure of an oscillatory tooth with an attached plunger pump.

DETAILED DESCRIPTION OF THE PREFERRED EMBODIMENT

FIG. 6a and 6b are detailed drawings which shows the structure of the oscillatory tooth and needle gear speed reducer of the preferred embodiment of the present invention. The basic features of the present invention can be seen from this embodiment. In this oscillatory tooth and needle gear speed reducer, case 11 is designed according to the installation requirement, which may be either vertically or horizontally installed. Input shaft 4 and output shaft 7 are aligned with each other. Output shaft 7 is supported in case 11 by rolling bearings 16. An annular oscillatory tooth disk 8 is mounted onto the inner end of said output shaft by bolts 24 or other means. In order to balance most internal and inertial loads, the present embodiment is structured with twin-row transmission. Two rows of equally spaced holes are radially drilled on oscillatory tooth disk 8, the two rows of holes being staggered half pitch of the holes. A cylindrical pin-shaped oscillatory tooth is fitted into each hole, a twin-row oscillatory tooth wheel H being thus structured. The tooth head of oscillatory teeth is shaped by two planes with specific angle $\alpha$ to form a wedged trapeoid. The oscillatory tooth body is cylindrical or with a little convexity, the tail being spherical or truncated cone-shaped. A small positioning plane 21 which leans on the side surface of the inserting ring 9 is milled near one end of oscillatory tooth body so as to prevent oscillatory tooth from rotating about its axis. The needle tooth disk 1 has an internal annular groove for housing the rolling sleeves 3. Along the pitch circle of needle teeth on needle tooth disk 1 are equally distributed a set of needle teeth which are preferably composed of needle pins 2 and rolling sleeves 3. When the space is not large enough, only needle pins 2 may be used and needle pins 2 may rotate freely in needle tooth disk 1. If the axial dimension is large enough, both rolling sleeves 3 and needle teeth 2 may be separated into two rows, the annular groove on needle tooth disk 1 should be structured also in two rows, namely an intermediate support is added at the middle of needle teeth. Needle teeth 2, rolling sleeves 3 and needle tooth disk 1 constitute needle tooth gear G. The difference between the number of needle teeth $Z_g$ and the number of one row oscillatory teeth $Z_h$ is $\pm1$, thus forming a transmission relation of "planetary transmission of small tooth number difference." One end of input shaft 4 is supported on case cover 12 by bearing 22 and the other end is supported in the inner end of output shaft 7 by rolling bearing 23. Case cover 12 and needle tooth disk 1 are connected to case 11 by a set of bolts 13. Two waveactuators J staggered 180° in phase are mounted onto input shaft 4, each of them facing one row of oscillatory teeth 10 and pressing against the bottom of oscillatory teeth 10 by means of the external circle of wave-actuator. Waveactuator J comprises an eccentric disk 5 and a rolling bearing 6 mounted on the former. As for large sized speed reducer, an annular disk may be mounted onto the external diameter of bearing 6 as shown in FIG. 7 in order to avoid using large bearings.

When input shaft 4 rotates, wave-actuator generates an eccentric motion which drives each oscillatory tooth 10 to move radially and harmonically. The wedged trapezoid tooth heads of oscillatory teeth 10 successively wedge into the spaces between needle teeth, generating a rigid meshing and thus making needle gear G and oscillatory tooth wheel H move relatively. Since the difference between $Z_g$ and $Z_h$ is $\pm 1$, oscillatory tooth wheel H will move one tooth relative to needle gear G in every revolution of wave-actuator J, forming a speed-reducing motion. The relative motion between oscillatory tooth wheel H and needle gear G makes the oscillatory teeth afer finishing their working strokes return back to their original positions under the action of meshing movement between tooth profiles, such recycle forming the planetary transmission with small tooth number difference for oscillatory tooth and needle gear transmission.

The efficiency of the oscillatory tooth speed reducer designed in accordance with the structure aforementioned may reach 0.9~0.94, the volume being ⅓ the size of ordinary reduction gear box under the same condition. The multi-tooth meshing has much greater load capacity which is six times greater than that of ordinary gear transmission under the same condition. Furthermore, the present oscillatory tooth speed reducer is simply structured and readily machined, has no special output mechanism and is easy to maintain, favorable to standardization and serialization.

FIG. 8 shows the structure of oscillatory tooth 10 in another embodiment in which the oscillatory tooth is structured to have the function as a plunger pump. The tooth body is made up of an internal and an external cylinders, one is sleeved into the other. A spring 14 is inserted in them and makes the two cylinders be always extended. There are two oiling apertures 15 on both sides of external cylinder and one aperture 16 at the lower part of internal cylinder. At the end of working stroke, the wave-actuator releases the oscillatory tooth which then extends under the action of spring 14, oiling aperture 16 opens and lubricating oil is sucked into the tooth body. During working stroke, oiling aperture 16 as closed and the lubricating oil in the tooth body will be squeezed out through apertures 15, the lateral surface of oscillatory tooth being sufficiently lubricated.

FIG. 9 shows the structure of oscillatory tooth 10 for another embodiment in which an attached small plunger pump 17 is structured in oscillatory tooth disk 8. An oiling groove 18 is milled on the plunger. During back stroke, the plunger is pushed out by spring 19 and oiling groove 18 is open to suck in lubricating oil. During working stroke, the plunger is pressed inward, oiling groove 18 is closed and the lubricating oil is squeezed through oiling aperture 20 into the pressure area of oscillatory tooth 10, which is then sufficiently lubricated.

The aforementioned two kinds of oscillatory teeth are improved structures for better lubrication. They are applied to heavy duty and large size oscillatory tooth transmission.

For large speed ratio there may be a great many oscillatory teeth to be fitted into oscillatory tooth disk. In order to ensure the strength of oscillatory tooth disk, the tooth number may be reduced to ½ by taking out every other tooth on condition $Z_h$ is even, thus maintaining the same speed ratio.

We claim:

1. An oscillatory tooth and needle gear transmitting device comprising three basic components:
    a wave-actuator J including an eccentric disk,
    an oscillatory tooth wheel H including a wheel body defining holes therein and a set of oscillatory teeth which reciprocate substantially radially in the holes, said wheel body and oscillating teeth assembled together in an oscillatory tooth disk, said wheel body surrounding the eccentric disk so that the is positioned to engage the oscillating teeth at their inward end to reciprocate the teeth in forward and backward strokes, and
    a stationary needle gear G including an annular needle tooth frame and a set of needle teeth fitted circumferentially onto the needle tooth frame, said needle teeth being distributed evenly defining a pitch $t_g$, the radially outward end of the oscillating teeth for engaging the needle teeth in order to accomplish motion and power transmission;
    wherein the relationship between the width of said oscillatory teeth $d_h$, the diameter of said needle teeth $d_g$ and the pitch of said needle teeth $t_g$ is $$d_h > t_g - d_g;$$

providing continuous transmission with constant speed ratio for the wave-actuator, the tooth wheel and the needle gear and the forward and backward strokes of the oscillating teeth are achieved by the meshing between tooth profiles of said oscillatory teeth and needle teeth.

2. The transmitting device of claim 1, wherein the oscillatory teeth are column-shaped.

3. The transmitting device of claim 2, wherein the oscillating teeth are each convex in cross section to facilitate lubrication.

4. The transmitting device of claim 3, wherein the oscillating teeth are cylindrical in shape.

5. The transmitting device of claim 2, wherein the oscillating teeth each has a small positioning plane on its side surface to prevent each oscillatory tooth from rotating about its own axis, thus ensuring correct meshing between the tooth profiles of oscillatory teeth and needle teeth.

6. The transmitting device of claim 1, wherein the oscillatory teeth have wedged trapezoid heads and spherical or miniature flat surface tails to achieve an approximate constant speed conjugation trannsmission with high accuracy.

7. The transmitting device of claim 1, wherein the needle teeth are rotatably connected to the needle tooth frame and wherein the needle tooth frame is a disk.

8. The transmitting device of claim 1, wherein the needle tooth frame has at lease one internal annular groove.

9. The transmitting device of claim 1, wherein the needle teeth are fixedly mounted onto the needle tooth frame, said transmitting device further comprising a plurality of rolling sleeves with each sleeve rotatably mounted on each needle tooth.

10. The transmitting device of claim 1, wherein the wave-actuator J further includes a standard rolling bearing.

11. The transmitting device of claim 1, wherein the wave-actuator J further comprises a standard rolling bearing and an annular ring fixed on the outer race of said rolling bearing.

12. The transmitting device of claim 1, said transmitting device comprises two rows of oscillatory tooth wheels H arranged side by side with the oscillatory teeth in the two rows staggered half a pitch with respect to one another; and two wave-actuators J, one corresponding to a row of said oscillatory tooth wheel H.

13. The transmitting device of claim 12, further comprising a plurality of rolling sleeves with each sleeve rotatably mounted on each needle tooth, and support means for supporting a mid-portion of each sleeve, said support means dividing each rolling sleeve into two portions, the two portions of the rolling sleeves for engaging respectively the oscillating teeth in the two rows of oscillating tooth wheels.

14. The transmitting device of claim 1, wherein the number of oscillatory teeth is one more or less than that of needle teeth according to the required rotating direction.

15. The transmitting device of claim 1, wherein the number of oscillatory teeth may be reduced to one half that of the oscillatory teeth calculated on the basis of speed ratio when the speed ratio is large so as to ensure sufficient strength of the oscillatory tooth disk.

16. The transmitting device of claim 1, wherein the oscillatory teeth is of pin-type oil pump construction in which said oscillatory tooth comprises an inside plunger and a spring for loading said plunger, and an outer sleeve with oiling apertures on both sides.

17. The transmitting device of claim 1, wherein the tooth wheel comprises and defines therein
pin-type oil pump which comprises an inside plunger with an oiling groove and a spring for loading said plunger for lubricating oscillating .

18. An oscillatory tooth and needle gear transmitting device comprising three basic components:
a wave-actuator J including a plate cam,
an oscillatory tooth assembly including a holder defining holes therein and a set of oscillatory teeth which reciprocate in the holes, said holder and oscillating teeth assembled together in an oscillatory tooth assembly, said oscillating teeth having front and rear ends, said holder placed adjacent to the plate cam so that the cam is positioned to engage the oscillating teeth at their rear ends to reciprocate the teeth in forward strokes, and
a stationary needle gear G including a needle tooth rack and a set of needle teeth fitted onto the needle tooth rack, said needle teeth being distributed evenly defining a pitch $t_g$, the front end of the oscillating teeth for engaging the needle teeth in order to accomplish motion and power transmission;
wherein the relationship between the width of said oscillatory teeth $d_h$, the diameter of said needle teeth $d_g$ and the pitch of said needle teeth $t_g$ is $$d_h > t_g - d_g;$$

providing the motion of the rack and of the needle teeth and causing at least some of the oscillating teeth to move towards the cam in backward strokes, and providing
continuous transmission with constant speed ratio for the wave-actuator, the oscillatory tooth assembly and the needle gear and the forward and backward strokes of the oscillating teeth are achieved by the meshing between tooth profiles of said oscillatory teeth and needle teeth.

19. The transmitting device of claim 18, wherein when one of the three components is fixed in position, the other two components will move relatively so as to realize a linear speed reducing transmission.

* * * * *